US009283878B2

(12) United States Patent
Zaouk et al.

(10) Patent No.: US 9,283,878 B2
(45) Date of Patent: Mar. 15, 2016

(54) SUPPORTING DEVICES TO ENHANCE USER COMFORT IN A SEATED POSITION

(71) Applicant: IPNOS TECHNOLOGIES LLC, Los Angeles, CA (US)

(72) Inventors: Rabih Bachir Zaouk, Venice, CA (US); Pere Margalef-Valldeperez, Venice, CA (US)

(73) Assignee: IPNOS TECHNOLOGIES LLC, Culver City, CA (US)

( * ) Notice: Subject to any disclaimer, the term of this patent is extended or adjusted under 35 U.S.C. 154(b) by 224 days.

(21) Appl. No.: 13/874,624

(22) Filed: May 1, 2013

(65) Prior Publication Data

US 2014/0325741 A1    Nov. 6, 2014

(51) Int. Cl.
*B60N 2/48* (2006.01)
*B60R 22/00* (2006.01)

(52) U.S. Cl.
CPC ............ *B60N 2/4879* (2013.01); *B60N 2/4808* (2013.01); *B60R 22/00* (2013.01); *B60R 22/001* (2013.01)

(58) Field of Classification Search
CPC ....................................................... A47C 7/383
USPC ................. 297/487, 393, 399, 409, 408, 391; 248/286.1, 191.1, 292.12, 459, 460, 248/150
See application file for complete search history.

(56) References Cited

U.S. PATENT DOCUMENTS

| | | | | |
|---|---|---|---|---|
| 491,651 A * | 2/1893 | Jordan | ........................... | 297/399 |
| 2,560,925 A | 7/1951 | Brown | | |
| 3,029,107 A * | 4/1962 | Myers | ........................... | 297/399 |
| 3,328,082 A * | 6/1967 | Knud | ........................... | 297/399 |
| 5,242,377 A * | 9/1993 | Boughner et al. | ............... | 602/17 |
| 5,314,404 A * | 5/1994 | Boughner et al. | ............... | 602/17 |
| 5,685,831 A * | 11/1997 | Floyd | ............... | 602/19 |
| D404,239 S | 1/1999 | Denney | | |
| 6,266,825 B1 * | 7/2001 | Floyd | ............... | 2/338 |
| 6,607,245 B1 | 8/2003 | Scher | | |
| 6,726,280 B1 * | 4/2004 | Liao | ........................... | 297/353 |

(Continued)

FOREIGN PATENT DOCUMENTS

DE    20 2006 008 863    8/2006
WO    WO 2013/063323    5/2013

OTHER PUBLICATIONS

Patent Cooperation Treaty International Searching Authority, "Invitation to Pay Additional Fees and, Where Applicable, Protest Fee," Feb. 7, 2013, in 8 pages, in International Application No. PCT/US2012/061995 (our reference IPTECH.001WO).

(Continued)

*Primary Examiner* — David R Dunn
*Assistant Examiner* — Timothy J Brindley
(74) *Attorney, Agent, or Firm* — Knobbe Martens Olson & Bear LLP

(57) ABSTRACT

The disclosure herein provides compact portable head supporting devices that secure a user's head in a position sufficient to enhance the user's comfort in a seated position. A head supporting device comprises a first member configured to be at least partially sandwiched between a user and a seat, a support apparatus configured to support a head of the user relative to the first member, and a coupling member configured to couple the support apparatus to the first member, the coupling member further configured to enable repositioning of the support apparatus with respect to the first member.

16 Claims, 15 Drawing Sheets

(56) References Cited

U.S. PATENT DOCUMENTS

| | | | |
|---|---|---|---|
| 6,799,802 B1 | 10/2004 | Moran | |
| 6,893,096 B2 * | 5/2005 | Bonn et al. | 297/409 |
| 7,004,545 B2 | 2/2006 | Miller | |
| D582,045 S | 12/2008 | James | |
| D629,178 S | 12/2010 | Lindsay | |
| 8,141,955 B1 * | 3/2012 | Maassarani | 297/393 |
| D670,035 S * | 10/2012 | Mieth et al. | D29/102 |
| 8,287,045 B1 * | 10/2012 | Donohue et al. | 297/393 |
| 8,528,978 B2 * | 9/2013 | Purpura et al. | 297/394 |
| 8,834,394 B2 * | 9/2014 | Ghajar | 602/18 |
| 8,876,210 B2 * | 11/2014 | Magstadt | 297/408 |
| 2002/0067063 A1 * | 6/2002 | Taborro | 297/397 |
| 2004/0046435 A1 * | 3/2004 | Bonn et al. | 297/409 |
| 2004/0070252 A1 * | 4/2004 | Stenzel et al. | 297/408 |
| 2004/0245832 A1 | 12/2004 | Miller | |
| 2006/0108850 A1 * | 5/2006 | Miller | 297/393 |
| 2009/0200851 A1 * | 8/2009 | Link | 297/409 |
| 2009/0271904 A1 | 11/2009 | Bentley | |
| 2011/0113557 A1 | 5/2011 | Aguilera | |
| 2011/0271421 A1 | 11/2011 | Vahey | |
| 2013/0104274 A1 * | 5/2013 | Zaouk et al. | 2/15 |
| 2014/0325741 A1 * | 11/2014 | Zaouk et al. | 2/173 |
| 2015/0042143 A1 * | 2/2015 | Maginness et al. | 297/393 |

OTHER PUBLICATIONS

Patent Cooperation Treaty International Searching Authority, "Notification of Transmittal of the International Search Report and the Written Opinion of the International Searching Authority, or the Declaration," Jun. 11, 2013, in 15 pages, in International Application No. PCT/US2012/061995 (our reference IPTECH.001WO).

* cited by examiner

SUPPORTING DEVICES TO ENHANCE USER COMFORT IN A SEATED POSITION

BACKGROUND

1. Field

The disclosure generally relates to the field of travel gear, and more particularly, for enhancing user comfort while traveling.

2. Description of the Related Art

Millions of economy class travelers have a strong desire to sleep on board a plane. The seat inclination for that category of travel is close to 90 degrees. Without proper neck and head support, only a small percentage of people manage to rest during travel. This same challenge faces people on trains, buses, cars, and even office workers that desire a small nap at their work desk.

Several devices attempt to address this problem. One such device is an U-shaped neck pillow. These pillows have achieved high market penetration despite low effectiveness. The U-shaped pillow only provides marginal lateral neck support, and no frontal head support. The devices are rather bulky and often have to be carried separately, which is inconvenient. Although more portable inflatable U-shaped pillows are available, they are less comfortable and equally ineffective in providing frontal head support. Full neck collars are available for improved head support, but these are even more bulky and restrict ventilation around the neck, inducing perspiration.

Tray inflatable pillows are available for use in situations where a food tray is present. These pillows provide decent support by filling up the space between the passenger and the food tray. They require a long time to inflate, however, and place the user in a precarious position where any movement of the neighboring front seat can disturb the sleep. Accordingly, a portable head supporting device that allows a person to rest in a seated position is desirable for travelers.

SUMMARY

Head supporting devices are provided that support a user's head to allow rest while traveling.

Some embodiments provide a head supporting device comprising a first member configured to be at least partially sandwiched between a user and a seat, a support apparatus configured to support a head of the user relative to the first member, and a coupling member configured to couple the support apparatus to the first member, the coupling member further configured to enable repositioning of the support apparatus with respect to the first member.

Some embodiments provide a head supporting device comprising a first member configured to be at least partially sandwiched between a user and a seat, and a support apparatus coupled to the first member and configured to secure the head of the user relative to the first member.

Some embodiments provide a head supporting device configured to support a head of a user comprising a support apparatus configured to couple to a seat and to secure the head of the user relative to the seat.

Some embodiments provide a head supporting device comprising a chin support member having a first surface configured to at least partially contact a chin of a user; and a chest support member having a second surface configured to at least partially contact a chest of the user, wherein the chin support member is coupled to the chest support member.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides supporting devices configured to enhance user comfort in a seated position. Various supporting devices are described that may be used alone or in combination with one or more other supporting devices.

Head Supporting Device

Figure 1:
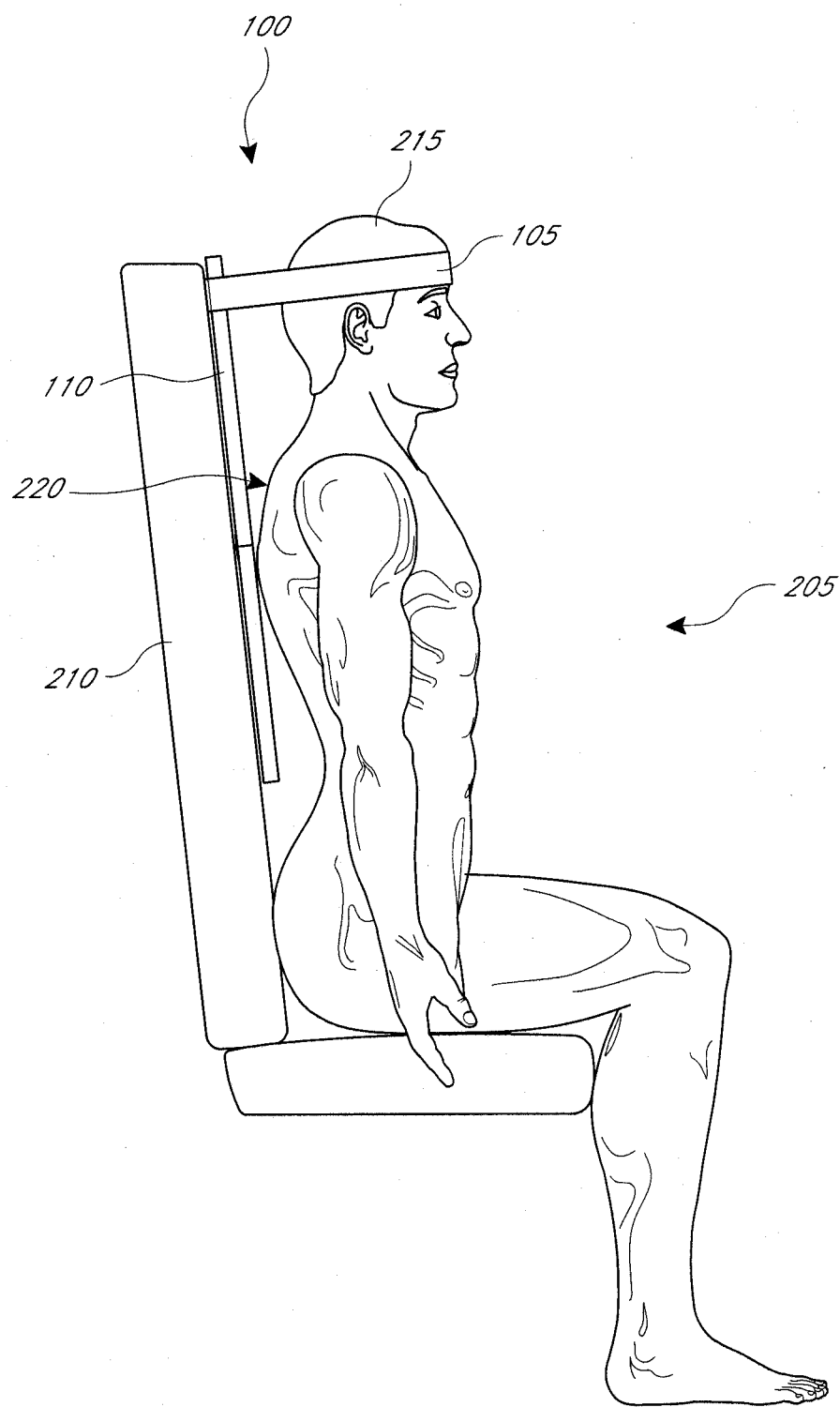
FIG. 1 is a side view of a user using a head supporting device according to an embodiment.

Some embodiments provide a head supporting device 100 that can be used during travel. The device can be configured for use in a seated or upright position, and is configured for supporting the user's head. As shown in FIG. 1, the head supporting device 100 comprises a first member 110 configured to be at least partially sandwiched between a user 205 and a seat 210, and a support apparatus 105 coupled to the first member 110 and configured to secure a head 215 of the user 205 relative to the first member 110.

In some embodiments, the first member 110 is substantially rigid in use, so it can support the head 215 of the user 205 in either leaning forward or leaning back positions. In some embodiments, the first member 110 may be a backplate anchor. The backplate anchor may be positioned between the user's back 220 and the seat 210, and thus anchor or secure the head supporting device 100 in position during use.

In some embodiments, the first member 110 can have a length varying from about 1 cm to about 100 cm and thickness varying from about 1 mm to about 50 mm, depending on the strength of the material. The first member 110 can be made of plastics (e.g., Acetal, Nylon, Polypropylene, etc.), fiber filled plastics, metals, fabrics, or any other material or combination of materials sufficiently rigid to function as described herein.

Figure 2:
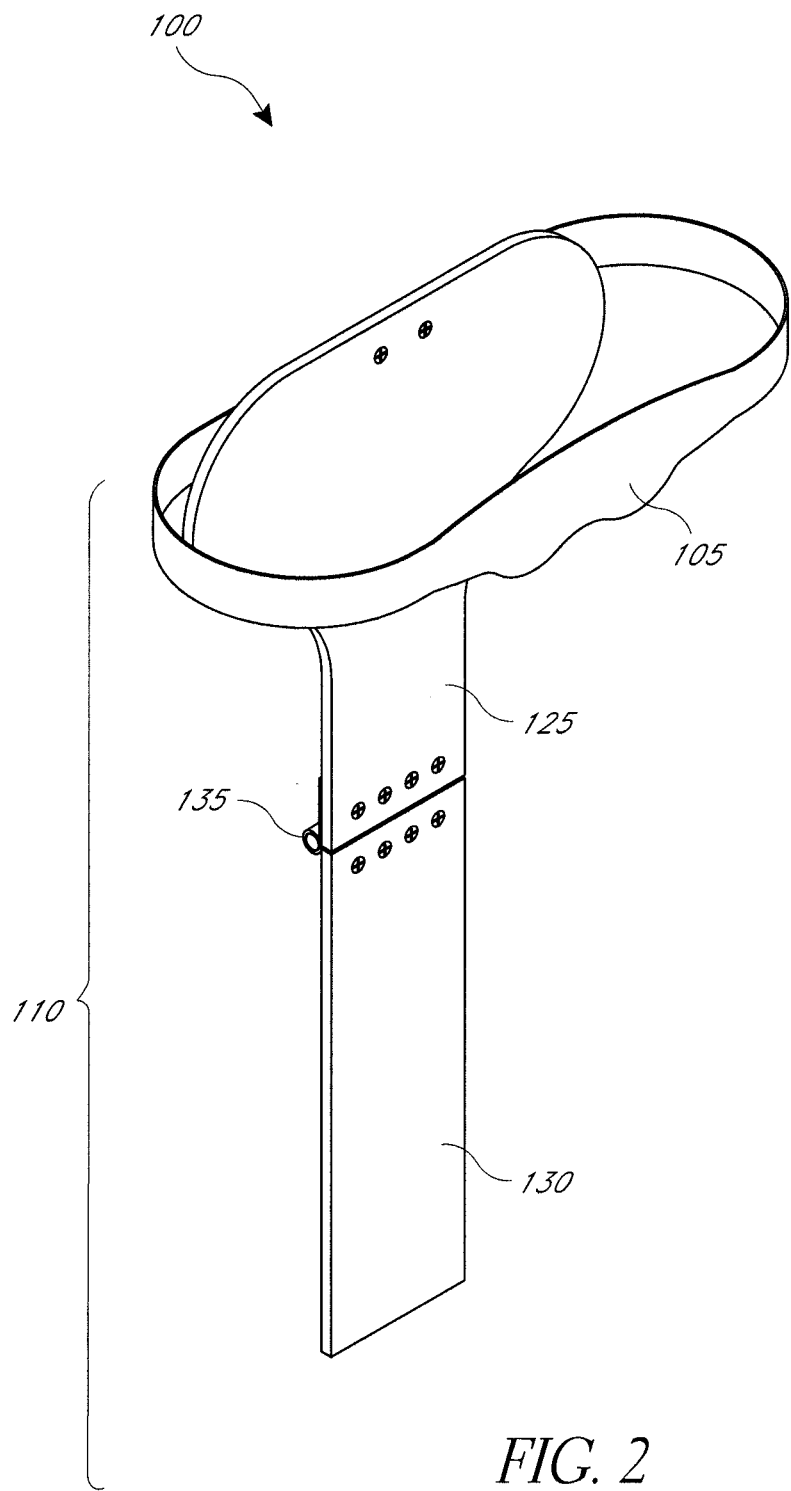
FIG. 2 is a perspective view of the head supporting device of FIG. 1 according to an embodiment.
Figure 3:
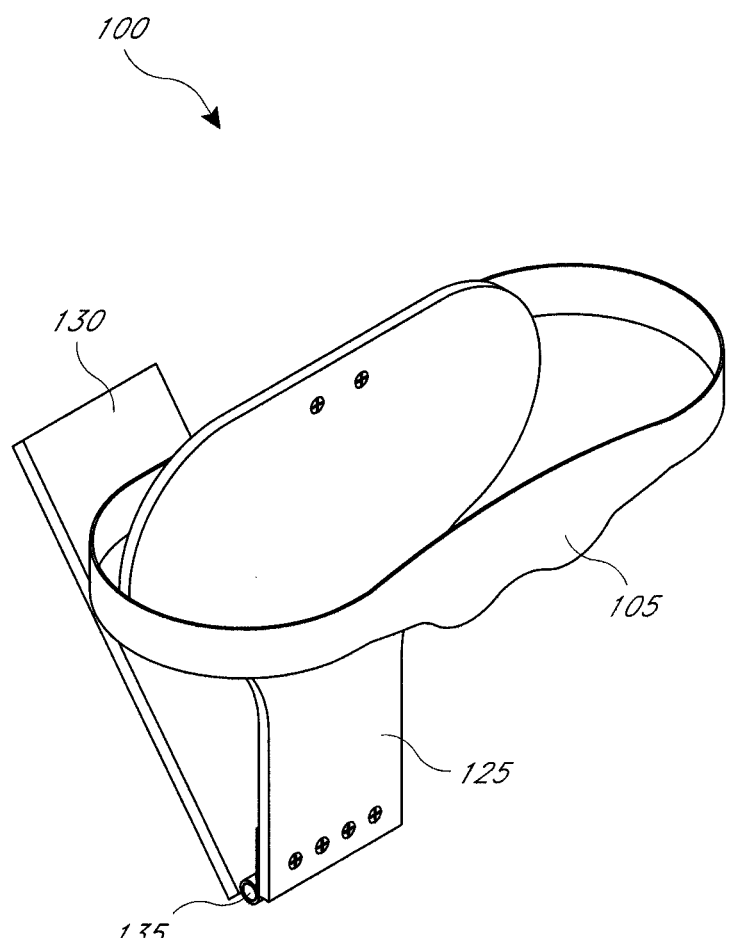
FIG. 3 is a perspective view of the head supporting device of FIG. 1 according to an embodiment.

The first member 110 may be designed to provide comfort to the user. In some embodiments, the backplate anchor may be thin enough that it is barely felt by the user 205. In some embodiments, padding may be added to the first member 110 where the first member 110 is configured to be sandwich between the user and the seat. In some embodiments, the backplate anchor may comprise a cut out at the location where the backplate anchor is to contact the spinal area of the back of the user. In some embodiments, no rigid material is present at the central portion along the longitudinal axis of the first member 110. In some embodiments, the cut out is provided on at least one portion of the backplate anchor. In some embodiments, additional padding may be added to the central portion along the longitudinal axis of the first member 110. In some embodiments, padding may also be added to the portion where the first member will be contacting the head of the user, In some embodiments, the first member 110 has an extended configuration and a collapsed configuration. In some embodiments, the first member 110 may comprise multiple smaller plates that are connected or coupled together through coupling members. With reference to FIG. 2, the first member 110 comprises at least a first portion 125 and a second portion 130. In some embodiments, the first portion 125 may be pivotably coupled to the second portion 130 of the first member 110 through a coupling member 135. In some embodiments, the coupling member 135 may be a hinge. The hinge may include a locking mechanism to make the backplate anchor substantially rigid. Alternatively, the hinge may have an end of travel stop, making the backplate anchor substantially rigid only when the first portion 125 is pulled in the direction of the user 205. In some embodiments, the hinge can have a restricted range of motion to ensure that the backplate does not substantially deform once it is placed in the desired position. FIG. 3 shows the head supporting device 100 in a partially collapsed configuration, making the overall size of the head supporting device 100 smaller for easier transportation.

Figure 4:
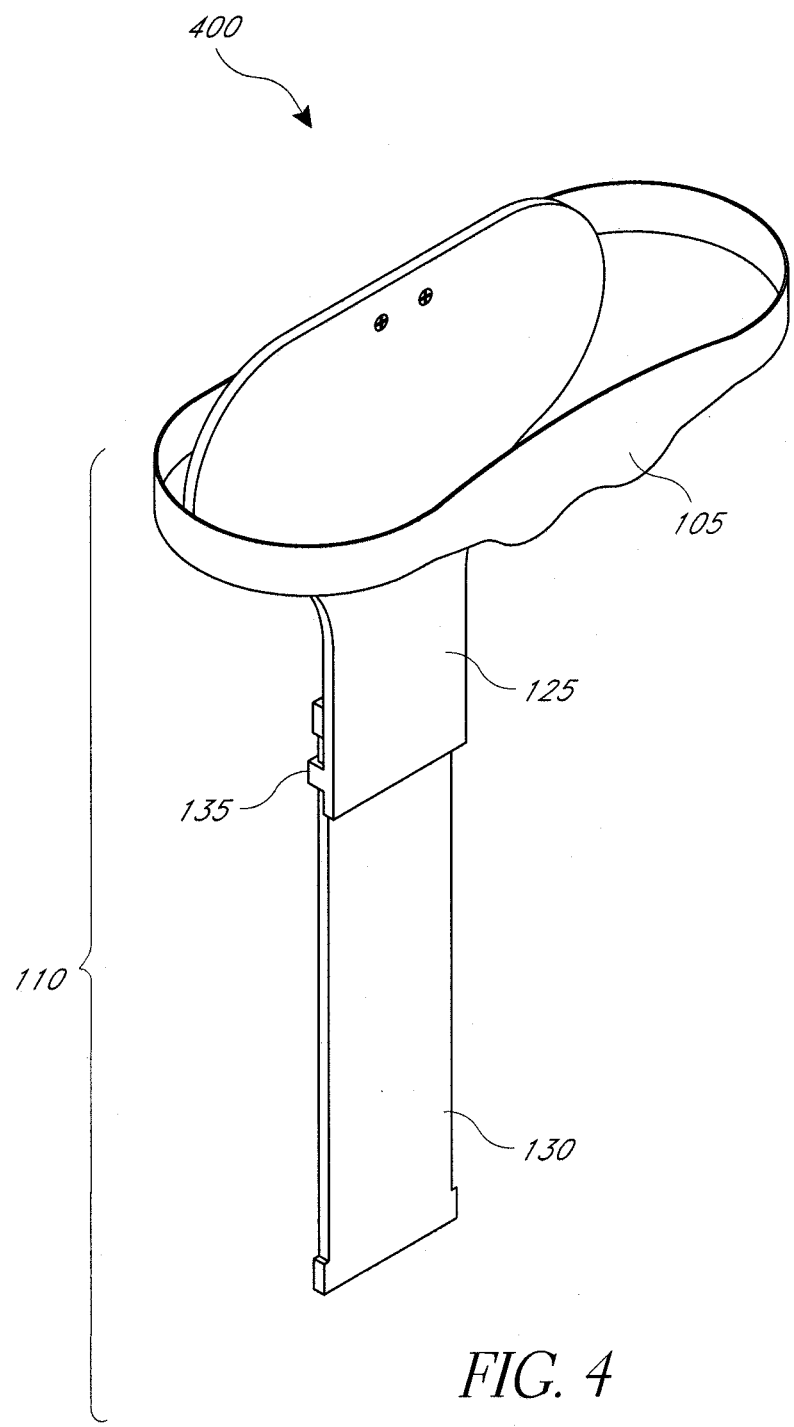
FIG. 4 is a perspective view of a head supporting device according to an embodiment.

In some embodiments, the first portion 125 may be slidably coupled to the second portion 130 as seen in FIG. 4. In some embodiments, the coupling member 135 may be a sliding joint, which enables the first 125 and the second portions 130 to slide toward each other so the two portions are stacked together for storage or easier transportation. In some embodiment, the coupling member 135 may be any type of joint or connector that allows the first member 110 to be collapsed down to a smaller size.

Dividing the first member 110 into smaller pieces serves to reduce the total size of the device for easier storage and portability. In other embodiments, more than two separate plates may be coupled together to allow the first member 110 to collapse to an even smaller overall size.

In some embodiments, the support apparatus 105 may comprise a strap or a headband. The strap or headband can be made of stretchable or non-stretchable fabric materials. For example, nylon or neoprene may be used in at least a portion of the support apparatus 105. In some embodiments, a rigid material or any other material sufficient to support a user's head 215 may also be incorporated into the support apparatus 105. In some embodiments, the at least a portion of the support apparatus 105 may be padded.

In some embodiments, the headband or strap may comprise two loose ends that are configured to be fastened or connected together through a fastening means. The fastening means may be a buckle, a clasp, a Velcro type closure, a hook-and-eye closure, a snap fastener, or a button. In some embodiments, the fastening means also allows adjustment to the strap or headband.

In some embodiments, the strap or headband includes at least one adjuster to allow adjustment to the length or fitment of the support apparatus 105. This may allow the support apparatus to be adjusted to fit various head sizes and to adjust to the most comfortable position for a particular user.

In some embodiments, the support apparatus 105 may incorporate at least one elastic portion between the support apparatus 105 and the first member 110. The elastic portion is stretchable and may allow a certain amount of head movement while a user's head is engaged with the support apparatus 105. In some embodiments, at least one elastic portion is incorporated into the support apparatus 105 where non-stretchable or material with low elasticity is used for the headband or the strap portion. In some embodiments, the head supporting device 100 further comprising two elastic portions or sections between the support apparatus 105 and the first member 110. This may be desirable to keep the user from feeling too constrained when using a head supporting device. In other embodiments, the entire headband or strap may be stretchable.

In some embodiments, the support apparatus 105 may further comprise a sleeping mask, which may be used to cover the eyes of the user and create an atmosphere more conducive to sleep. The sleeping mask can be attached to the headband using a detachable fastener, such as a hook and loop faster or Velcro. Making the sleeping mask easily detachable may make it easier to wash. The sleeping mask can also be perfumed, contain plastic beads, aromatic beads, or other materials conducive to a better sleeping condition.

In some embodiments, a head supporting device 100 may additionally incorporate a padded member positioned between the first member 110 and the user 205. The padded member may be positioned to be sandwiched between the user's head and/or neck and the first member 110. The padded member may be movably coupled to the first member 110. The padded member may be positioned by the user 205 to most effectively support the back of the user's head and/or neck while seated in the seat 210. In other embodiments, the padded member may be detachably coupled to the first member 110, allowing the user to reposition the padded member by detaching it and then reattaching it in a different location. In some embodiments, the padded member may be a pillow or a small padded head rest.

In some embodiments, the padded member may be fixedly attached to the first member 110. To adjust positioning of the padded member, the user would adjust the positioning of the first member 110. In other embodiments, the padded member may be a separate device not attached to the first member 110. In other embodiments, the padded member may be slidably coupled to the backplate anchor, allowing the padded member to slide in one direction with respect to the backplate anchor, such as to adjust for a user's height.

In some embodiments, the head supporting device 100 may further comprises two side support members positioned adjacent to where the support apparatus are attached to the first member 110. In some embodiments, the side support member may include substantially rigid arms extending out from the first member and positioned at both side of the user's head to provide additional lateral support to the user. The substantially rigid arms may be used in combination with the support apparatus 105 for even further lateral and frontal support. In some embodiments, the substantially rigid arms can connect to the first member 110 using a pivotal connector. The pivotal connector may be a hinge, a ball joint, or a simple pin.

In some embodiments, the first member 110 can also include connectors to hold a multitude of gadgets or objects to free up the user's hands. An object may connect directly to the head supporting device, or a support member, such as a supporting arm, may connect the object to the head supporting device. Examples of objects that may be supported are a journal, book, tablet PC, other electronic devices, phone, mirror, fan, video display, cup holder, music player, or alarm clock.

A head supporting device 100 can be used in various different modes. One mode is when a user 205 leans slightly forward and rests his head 215 on the support apparatus 105 (such as a headband) for a good comfortable sleeping or reading position (as shown in FIG. 1). Another mode is when the user leans back on the first member 110 and rests his head 215 on the backplate or a padded member (or headrest) in order to minimize neck strain when, for example, the seat is too low and does not incorporate a headrest. While leaning back against the backplate or padded headrest, the user may optionally adjust the headband to help secure the user's head relative to the backplate or padded member.

FIG. 1 shows the user 205 using the head supporting device 100 in a mode where the user's head 215 is leaning forward onto the support apparatus 105. The user's head 215 exerts a force on the support apparatus 105, which then exerts a force on the first member 110. This creates a momentum that is counteracted by the momentum that originates from a reaction force of the seat 210, allowing the user's head 215 to be supported. In a configuration where a user is resting his or her head on the support apparatus 105, the momentum created by the force exerted by the user's backward-leaning head is counteracted by the momentum created by the reaction force of the user's lumber area over the support apparatus 105.

Friction forces between the user's back 220 and the seat 210 generally keep the first member 110 from moving. In essence the first member 110 is sandwiched between the user 205 and the seat 210 and forms an anchor that can easily support forces of the order of tens of Newtons. The user 205 can adjust the first member 110 up, down, or sideways according to his or her preference. The seated user 205 can additionally personalize the fit of the support apparatus 105 as well as the position of the first member 110 until a comfortable position is reached. The user 205 can also choose to lean sideways into the support apparatus 105 and optimize for a comfortable sleeping position. The user 205 can also choose to lean back and rest his or her head 215 on the first member 110. When the user's head 215 is resting on the first member 110, the support apparatus 105 may optionally be adjusted to hold the user's head 215 against the first member 110 to support the user's head 215 while sleeping or resting.

In some embodiments, a user may adjust the length of the support apparatus 105 using adjusters to configure the head supporting device to meet that user's needs. For example, the user may adjust the support apparatus 105 to be longer so that the user's head 215 is leaning away from the first member 110 and/or padded member while the front of the user's head is supported by the support apparatus 105. The user may alternatively lean his or her head back against the first member 110 and/or padded member without tightening the support apparatus 105 to support the back of the head 215 without any frontal support. In some embodiments, the user may both lean his or her head back into the first member 110 and/or padded member while tightening the support apparatus 105 to provide support to both the front and back of the user's head. In various configurations, the first member 110, padded member, and support apparatus 105 provide lateral support to the user's head in addition to supporting the front and back of the user's head.

Head Supporting Device Coupled to a Seat

Figure 5:
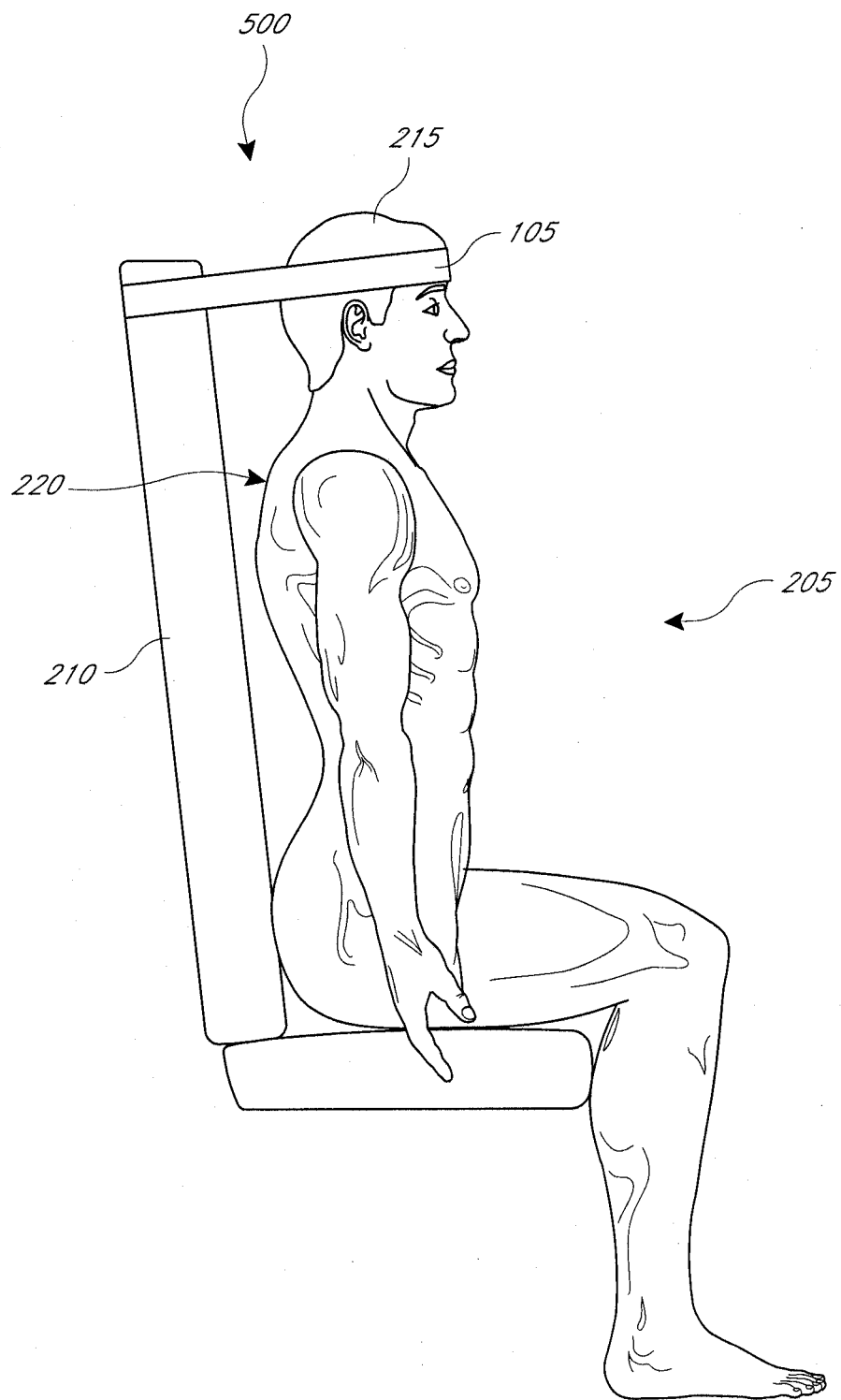
FIG. 5 is a side view of a user using a head supporting device according to an embodiment.

Some embodiments provide a head supporting device 500 that can be coupled or integrated to a seat. As shown in FIG. 5, the head supporting device 500 comprises a support apparatus 105 configured to couple to a seat 210 and to secure the head 215 of the user relative to the seat 210. The support apparatus 105 may be solidly secured to the seat 210 through a permanent or temporary attachment.

In some embodiments, the support apparatus 105 can couple to the seat 210 by wrapping around the backrest of the seat 210. In some embodiments, a seat strap may be used to provide anchoring points or attachment points for coupling to the support apparatus 105. The support apparatus 105 then can be coupled to the seat 210 indirectly through attachment to the seat strap. For example, the seat strap may be strapped around the upper seatback and provide attachment areas or anchors for the support apparatus 105 to be securely coupled to the strap.

In some embodiments, the support apparatus 105 can be directly attached to the seatback or the seat strap that has been strapped around the seatback. For example, Velcro type attachment at the attachment point(s) may be used to secure the support apparatus to the seat 210 or seat strap. In some embodiments, the support apparatus 105 may have two attachment ends for coupling to the seat directly or through the seat strap. In other embodiments, the support apparatus 105 may form a loop, and at least one attachment point is provided on the loop for coupling to the seat or the seat strap.

In other embodiments, the support apparatus 105 may be anchored into the seatback or the cushion of the headrest. Some seatback or headrests may optionally provide appropriate anchoring location or anchor points for such attachment. A large clamp secured to the headrest can also be used as an anchor for the support apparatus 105.

In some embodiments, the support apparatus 105 may be coupled to the headrest of the seat 210. The support apparatus 105 may further comprise two looped attachment ends that can be strapped onto both sides of the headrest on the seat 210. The looped attachment ends may also be adjustable for secured attachment. Any suitable mechanisms that allow the support apparatus 105 to be coupled to the headrest are within the scope of the embodiments.

In some embodiments, the support apparatus 105 may be integrated into a seat 210, such as seats with high back or with headrest. The support apparatus 105 can be attached to the seat 210 at a location suitable for engaging the head of the user at a seated position. In some embodiments, the support apparatus 105 is attached or coupled directly to a headrest of the seat 210. In some embodiments, the support apparatus 105 is coupled or attached to the seat 210 through a mechanism that allows the position of the support apparatus 105 to be adjusted. For example, the support apparatus 105 may be slidably coupled to the seat back at or near the headrest, so the user may slide the support apparatus 105 up or down depending on the location of the user's head.

In some embodiments, the support apparatus 105 may comprise a strap or a headband. The strap or headband can be made of stretchable or non-stretchable fabric materials. For example, nylon or neoprene may be used in at least a portion of the support apparatus 105. In some embodiments, a rigid material or any other material sufficient to support a user's head 215 may also be incorporated into the support apparatus 105. In some embodiments, at least a portion of the support apparatus 105 may be padded.

In some embodiments, the headband or strap may comprise two loose ends that are configured to be fastened or connected together through a fastening means. The fastening means may be a buckle, a clasp, a Velcro type closure, a hook-and-eye closure, a snap fastener, or a button. In some embodiments, the fastening means also allows adjustment to the strap or headband.

In some embodiments, the strap or headband includes at least one adjuster to allow adjustment to the length or fitment of the support apparatus 105. This may allow the support apparatus 105 to be adjusted to fit various head sizes and to adjust to the most comfortable position for a particular user.

In some embodiments, the support apparatus 105 may incorporate at least one elastic portion that may allow a certain amount of head movement while a user's head is engaged with the support apparatus 105. In some embodiments, at least one elastic portion is incorporated into the support apparatus 105 where non-stretchable or material with low elasticity is used for the headband or the strap portion. In some embodiments, the head supporting device 100 further comprising two elastic portions or sections between the support apparatus 105 and the seat 210. This may be desirable to keep the user from feeling too constrained when using a head supporting device. In other embodiments, the entire headband or strap may be stretchable.

In some embodiments, the support apparatus 105 may further comprise a sleeping mask, which may be used to cover the eyes of the user and create an atmosphere more conducive to sleep. The sleeping mask can be attached to the headband using a detachable fastener, such as a hook and loop fastener or Velcro. Making the sleeping mask easily detachable may make it easier to wash. The sleeping mask can also be perfumed, contain plastic beads, aromatic beads, or other materials conducive to a better sleeping condition.

In some embodiments, the head supporting device 500 may further comprise a padded member coupled to the support apparatus 105, wherein the padded member is configured to be at least partially sandwiched between the user 205 and the seat 210. In some embodiments, the padded member is not coupled to the support apparatus 105, and the padded member and support apparatus 105 are separate devices used together by a user.

Adjustable Head Supporting Device

In some embodiments, an adjustable or shapeable head supporting device is provided. A head supporting device may be configured to be adjustable to enable, for example, adjusting the device to the shape of a seat. For example, some airline seats include a protruding headrest that could cause a head supporting device having a straight, non-adjustable backplate anchor to push a user's head forward into an uncomfortable position. A head supporting device may also be shapeable to conform to a user's unique body shape and or to his or her preferred seating position. Some users may be more comfortable in different seating positions than other users. Therefore, allowing a head supporting device to be adjustable or shapeable to conform to a user's preferred seating position can be desirable.

Figure 10:
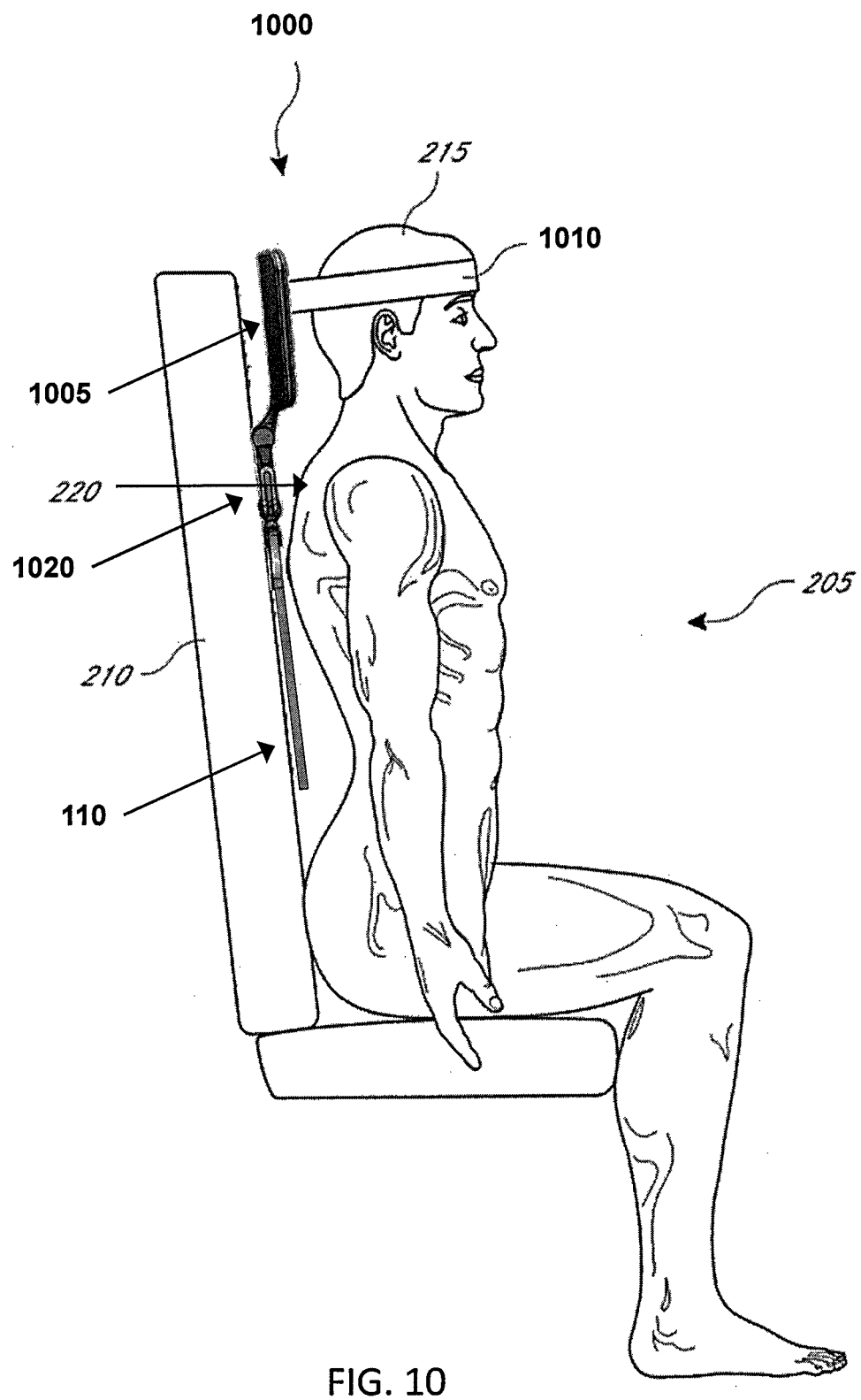
FIG. 10 is a side view of a user using a head supporting device according to an embodiment.
Figure 11:
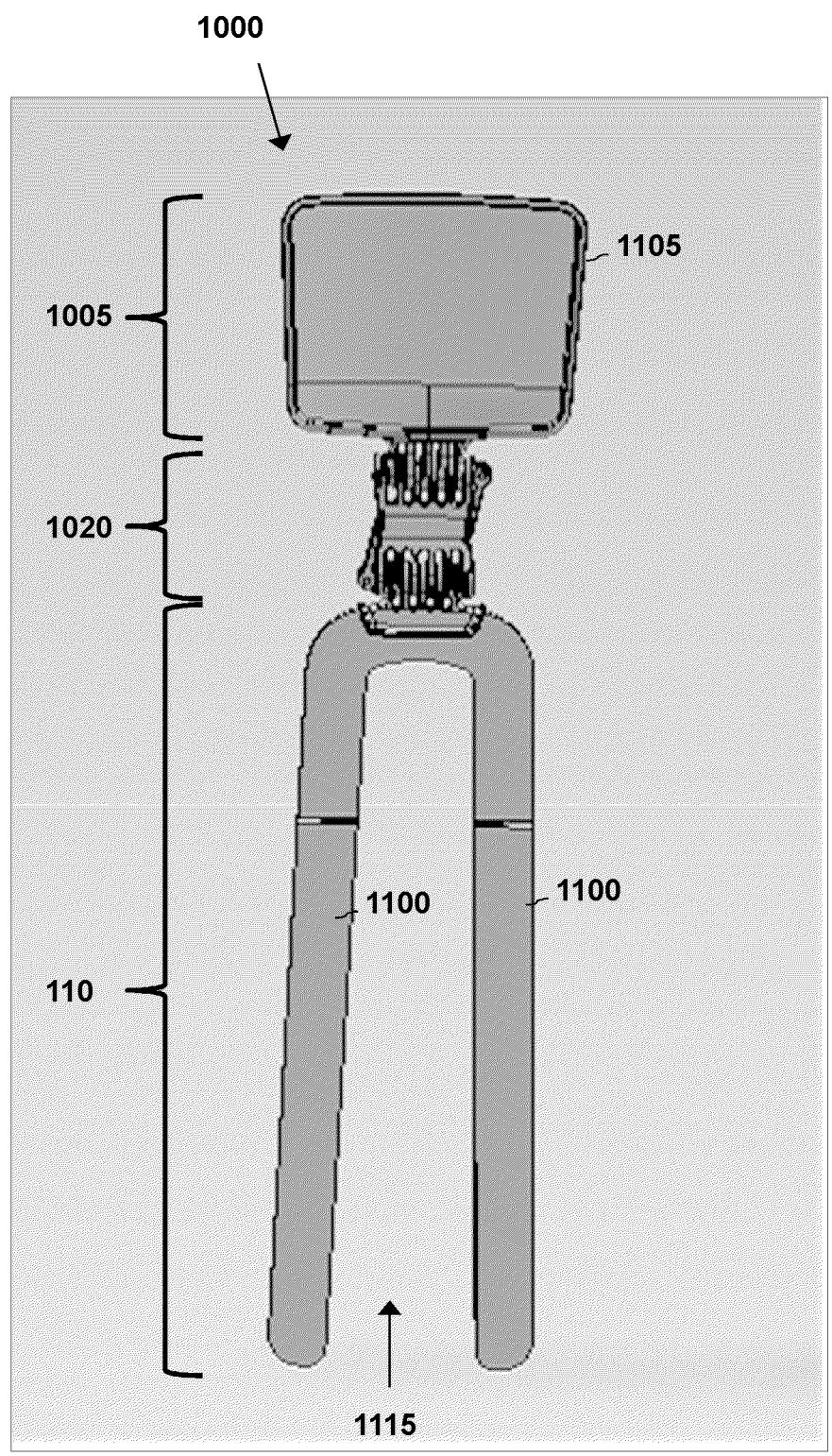
FIG. 11 is a front view of the head supporting device of FIG. 10 according to an embodiment.

FIG. 10 illustrates a side view of an embodiment of an adjustable head supporting device 1000 in use with a user 205. FIG. 11 illustrates a front view of the head supporting device 1000. In this embodiment, the head supporting device 1000 comprises a support apparatus 1005, a coupling member 1020, and a first member 110. In this embodiment, the coupling member 1020 couples the support apparatus 1005 to the first member 110. The coupling member 1020 enables the support apparatus 1005 to be adjusted, positioned, or repositioned with respect to the first member 110. Similar to the head supporting device 100 illustrated in FIG. 1, the head supporting device 1000 is configured to have the first member 110 sandwiched between the back 220 of the user and to act as a backplate anchor for the support apparatus 1005. In this embodiment, the coupling member is approximately 2 inches long and is configured to not be in contact with the user's back. However, in other embodiments, the coupling member may be various lengths and may or may not be configured to be in contact with the user during use. In some embodiments, the support apparatus 1005 comprises a strap or headband 1010 configured to at least partially secure the user's head 215 with respect to the support apparatus 1005 and/or the first member 110.

In the embodiment illustrated in FIG. 10, the seat 210 has a generally straight shape and no protruding headrest. Therefore, the head supporting device 1000 is illustrated in a relatively straight configuration. However, as illustrated in FIG. 14B, the head supporting device 1000 can be adjusted using joints of the coupling member 1020 to position or reposition the support apparatus 1005. For example, as shown in FIG. 14B, the head supporting device 1000 has been adjusted to, for example, make room for or conform to a protruding headrest of a seat.

As illustrated in FIG. 11, the first member 110 of the head supporting device 1000 comprises two legs 1100 separated by a gap 1115. The legs 1100 in this embodiment are relatively thin and configured to at least partially conform to a shape of a user's back. Utilizing relatively thin legs 1100 can be advantageous over utilizing a solid backplate anchor, as illustrated in FIG. 2, because the legs 1100 may be more comfortable for the user. The legs 1100 can comprise, for example, an aluminum alloy configured to be light and thin but still strong enough to perform the functions described herein. The legs 1100 can comprise various other materials, however, as long as the material is sufficient to perform the functions of the first member 110 as described herein. In some embodiments, the legs 1100 are about one inch in width and about 0.09 inches in thickness or less than 0.09 inches in thickness and are separated by a gap 1115 of approximately 2 to 3 inches.

As shown in the embodiment illustrated in FIG. 11, the support apparatus 1005 of the head supporting device 1000 comprises a base portion 1105. In some embodiments, the support apparatus 1005 further comprises a padded member or pillow or cushion configured to be positioned between the base portion 1105 and the back of a user's head. An example of a padded member or pillow can be seen in FIG. 15A. In some embodiments, the strap 1010 is attached to the base portion 1105. In some embodiments, as further illustrated in FIGS. 15A and 15B, the strap 1010 is configured to be detachable at least one end from the base portion 1105.

Figure 12:
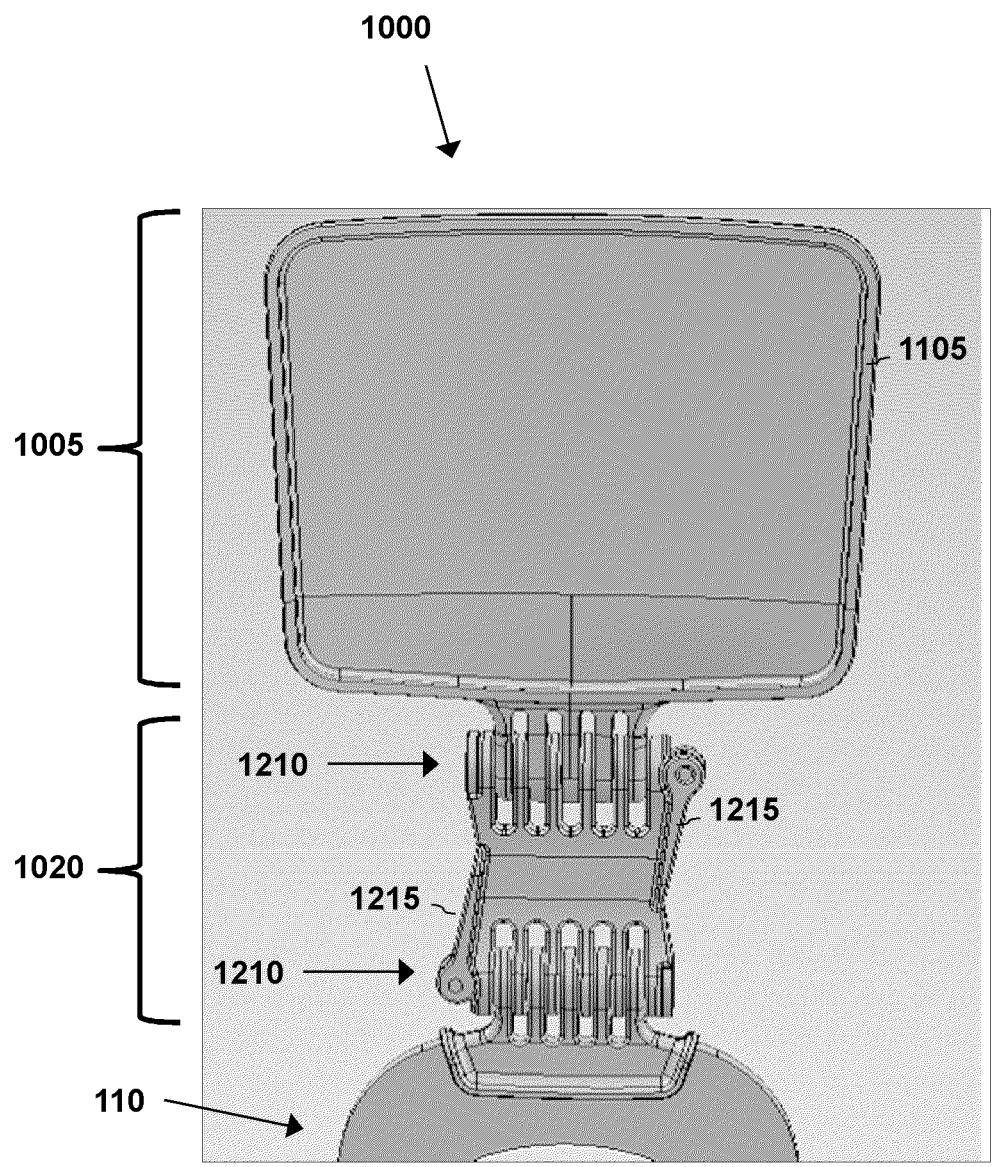
FIG. 12 is a front view of a support apparatus and coupling member of the head supporting device of FIG. 10 according to an embodiment.

FIG. 12 illustrates a front view of the support apparatus 1005 and coupling member 1020 of the head supporting device 1000. In this embodiment, the coupling member 1020 comprises two joints 1210 configured to enable the support apparatus 1005 to be adjusted with respect to the coupling member 1020 and the first member 110. One of the joints 1210 is configured to couple the support apparatus 1005 to the coupling member 1020. The other joint 1210 is configured to couple the first member 110 to the coupling member 1020. Each of the joints 1210 comprises a lever 1215 configured to lock or unlock the joints 1210. Each of the joints 1210 has a locked state and an unlocked state. In the unlocked state, the joint is configured to allow the support apparatus 1005 and/or the first member 110 to be moved or adjusted with respect to the coupling member 1020. In the locked configuration, the joints 1210 are configured to be stiff enough or to have sufficient rigidity to enable the support apparatus 1005 to support the user's head with respect to the first member 110, as described herein. In use, a user can rotate one or both of the levers 1215 to unlock one or both of the joints 1210. Then, when the user has positioned, repositioned, or shaped the head supporting device to a desirable shape or position, the user can rotate the levers 1215 to the locked position, to lock the head supporting device in the current shape or position.

Figure 13:
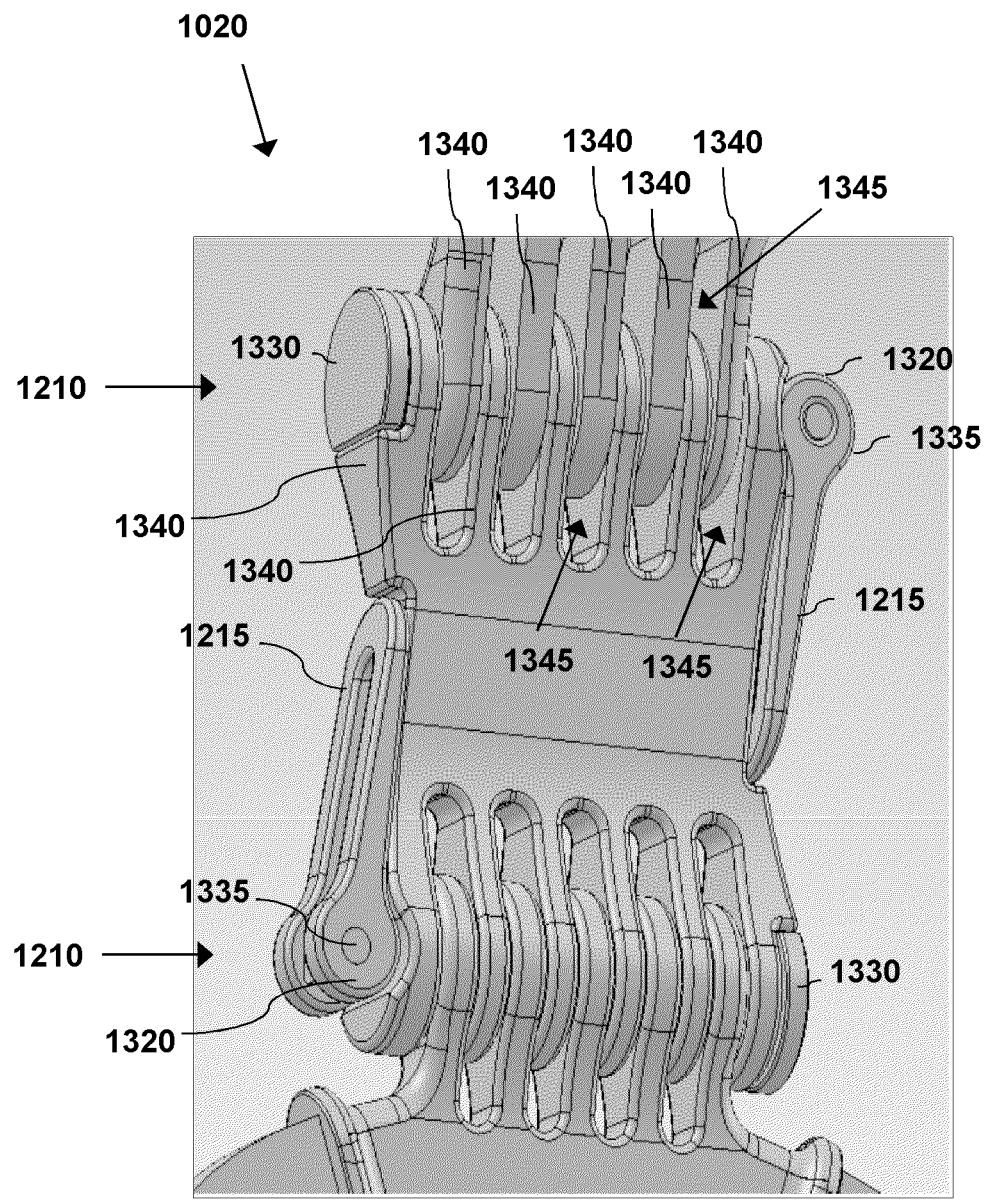
FIG. 13 is a perspective view of a coupling member of the head supporting device of FIG. 10 according to an embodiment.

FIG. 13 illustrates a perspective view of the coupling member 1020 showing more details of the joints 1210. In this embodiment, the joints 1210 each comprise a first half and a second half. For example, the first half may connect to the support apparatus 1005 or the first member 110 while the second half connects to the coupling member 1020. Each of the halves of the joints 1210 comprises a plurality of fingers (or arms or protruding members) 1340 separated by interstitial spaces 1345. The fingers 1340 of one half of the joint 1210 are configured to mesh with the fingers 1340 of the other half of the joint 1210. The fingers 1340 are configured to mesh along an axis of rotation of the joint 1210 defined by an axis of a shaft 1330. The shaft 1330 is configured to pass through a hole in each of the fingers 1340 and to engage the lever 1215 at an opposite end of the joints 1210. The lever 1215 engages the shaft 1330 using a pin 1335 passing through both the lever 1215 and the shaft 1330.

In this embodiment, the lever 1215 is configured to rotate around the pin 1335 to alternate the joint 1210 between the locked and unlocked states. The lever 1215 comprises a cam 1320 adjacent to a mating surface of one of the fingers 1340. The cam 1320 is configured to apply a locking force along the axis of rotation of the joint 1210 to the mating surface of the finger 1340 when the lever is in the locked configuration. This locking force is configured to be sufficient to force the various fingers 1340 against each other, creating a friction force sufficient to stop the joint 1210 from rotating when the head supporting device 1000 is being used to support a user's head. When a lever 1215 is rotated away from the coupling member 1020, the cam 1320 is configured to lessen or reduce the force applied to the mating finger 1340 to reduce or eliminate the friction force between the fingers 1340 of the two halves of the joint 1210. By reducing or eliminating the friction force, the two halves of the joint 1210 can be rotated with respect to each other to enable shaping, positioning, or repositioning of the head supporting device 1000.

While the embodiment of a head supporting device illustrated in FIGS. 10 through 15B illustrates a coupling member 1020 utilizing two pivot joints each configured to enable one degree of rotational freedom of motion, an adjustable head supporting device may be configured to be adjustable in various other ways. For example, a coupling member may utilize one or more (or a combination of) hinge joints, pivot joints, sliding joints, ball and socket joints, flexible materials, such as a relatively rigid but deformable material such as malleable metal, and/or the like. Additionally, while the embodiment of a head supporting device 1000 illustrated in these figures comprises joints 1210 having locked and unlocked configurations, a head supporting device may in some embodiments comprise one or more joints that, rather than needing to be unlocked to be adjusted, have a certain preload force. In these embodiments, the user merely needs to overcome that preload force to adjust or position the joint.

Figure 14A:
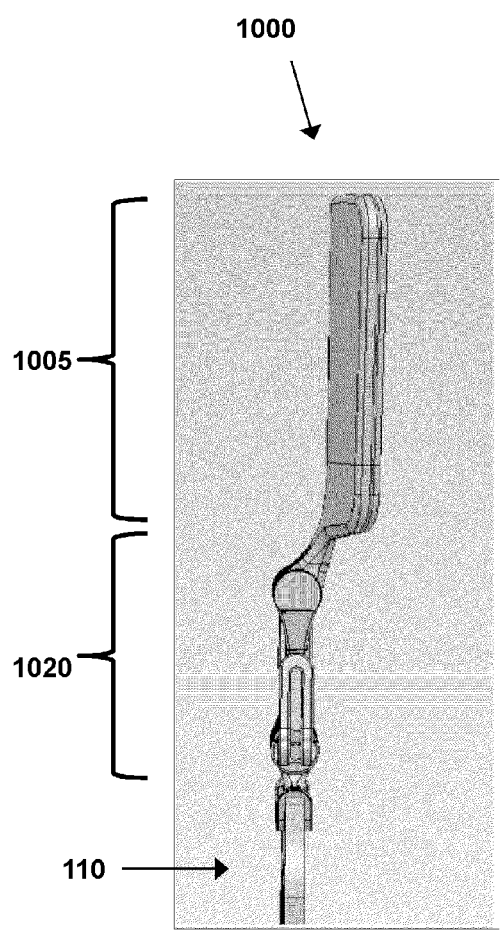
FIG. 14A is a side view of the head supporting device of FIG. 10 according to an embodiment.
Figure 14B:
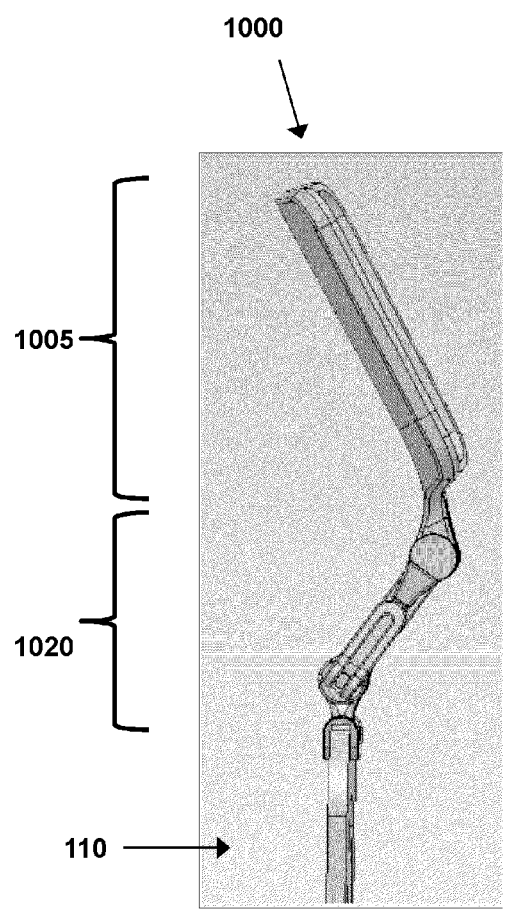
FIG. 14B is a side view of the head supporting device of FIG. 10 according to an embodiment.

FIGS. 14A and 14B illustrate side views of an embodiment of the head supporting device 1000 in two different configurations. The configuration shown in FIG. 14A is similar to the configuration shown in FIG. 10. This configuration may be advantageous, for example, when a seat does not have a protruding headrest. FIG. 14B illustrates the head supporting device 1000 shaped or adjusted differently, for example, to be shaped around a protruding headrest of a seat or simply to be shaped in a more comfortable position for the user. Although FIGS. 14A and 14B illustrate two configurations or shapes of the adjustable head supporting device 1000, the head supporting device 1000 may be shaped in any way that is comfortable for the user.

Figure 15A:
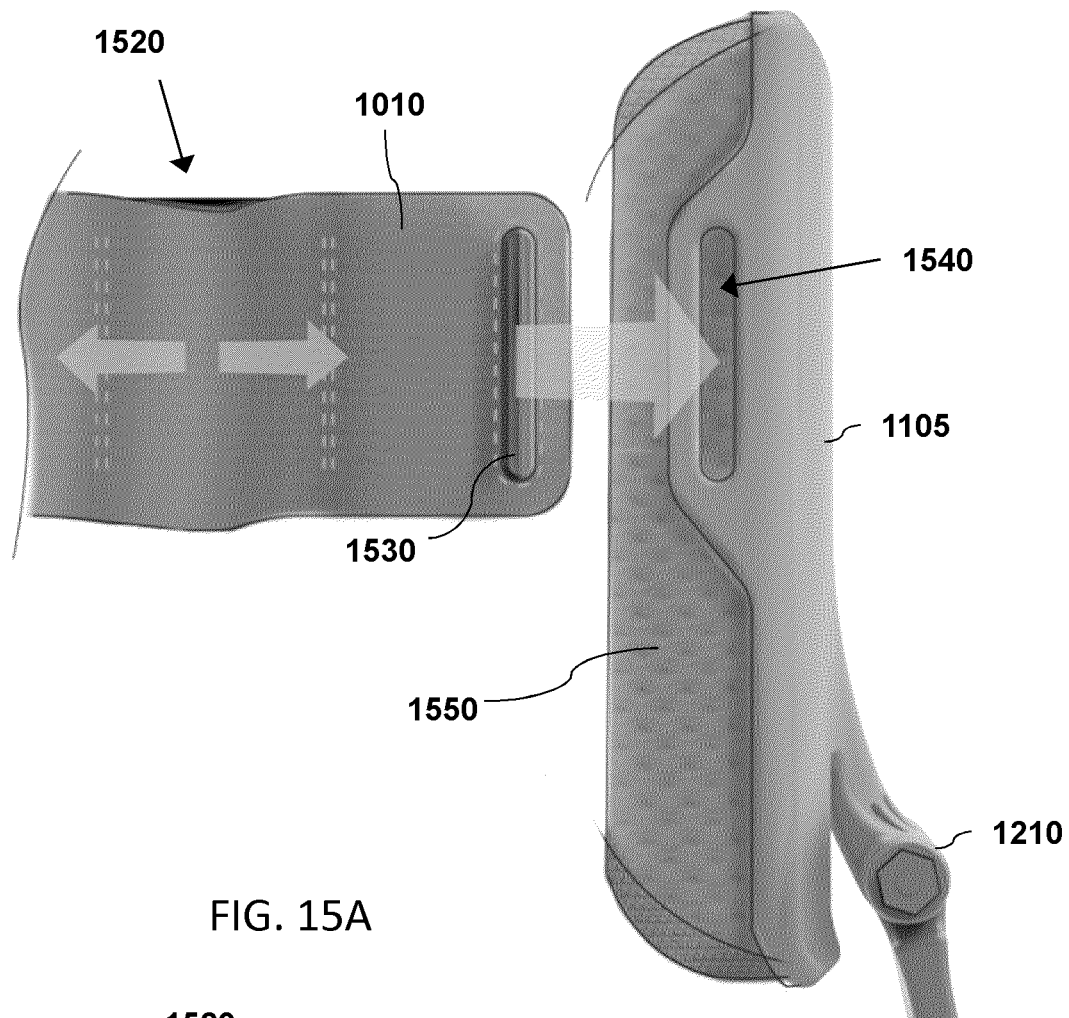
FIG. 15A is an exploded view of a support apparatus of a head supporting device according to an embodiment.
Figure 15B:
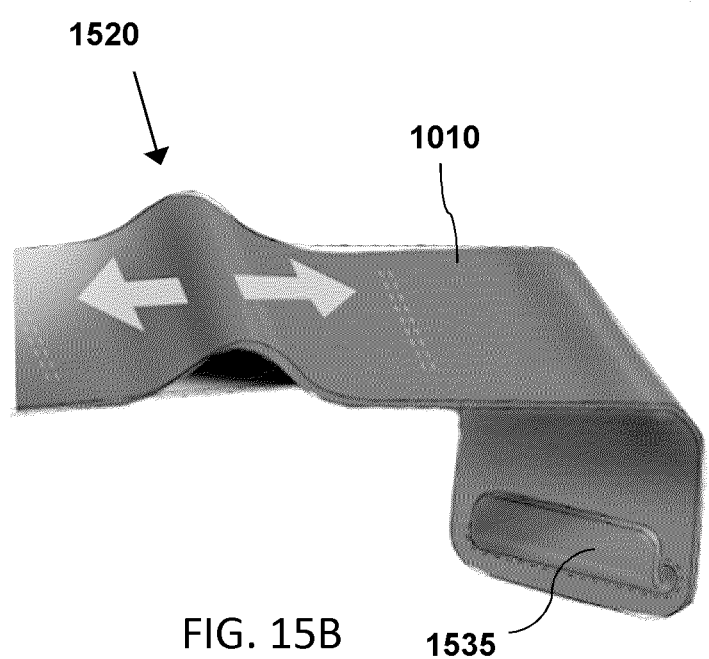
FIG. 15B is a perspective view of a strap of the support apparatus of FIG. 15A according to an embodiment.

FIGS. 15A and 15B illustrate additional details of an embodiment of a support apparatus 1005. FIG. 15A illustrates an exploded view of a support apparatus 1005 comprising a base portion 1105, a padded member or pillow or cushion 1550 attached to the base portion 1105, and a strap 1010 configured to be releasably attached to the base portion 1105. A releasably attached strap 1010 can be an advantageous and/or convenient embodiment of a support apparatus 1005 that can enable a user to detach himself or herself from the head supporting device without having to reach behind himself or herself to remove the entire back support. In some embodiments, the strap 1010 is configured to be detachable at both ends of the strap 1010. In other embodiments, the strap 1010 is configured to be relatively permanently attached to the base portion 1105 at one end, but releasably attached at the other end.

FIG. 15B illustrates a perspective view of the strap 1010 showing a hook or buckle 1535 configured to engage a slot 1540 of the base portion 1105. The strap 1010 additionally comprises a handle 1530 to help the user connect and/or disconnect the strap 1010 from the base portion 1105. FIGS. 15A and 15B additionally illustrate an elastic portion 1520 of the strap 1010. It can be advantageous to have a strap be stretchable to prevent a user from feeling tethered and/or trapped. An elastic portion 1520 can be configured to enable the strap 1010 to stretch by a predetermined amount. In some embodiments, an elastic portion 1520 can be configured to allow an overall or full length of the strap 1010 to stretch by about 5% to about 8%. In other embodiments, one or more elastic portions can be configured to allow an overall or full length of the strap 1010 to stretch less or more than 5% or 8%.

Head Supporting Device Engaging a User's Chin

Figure 6:
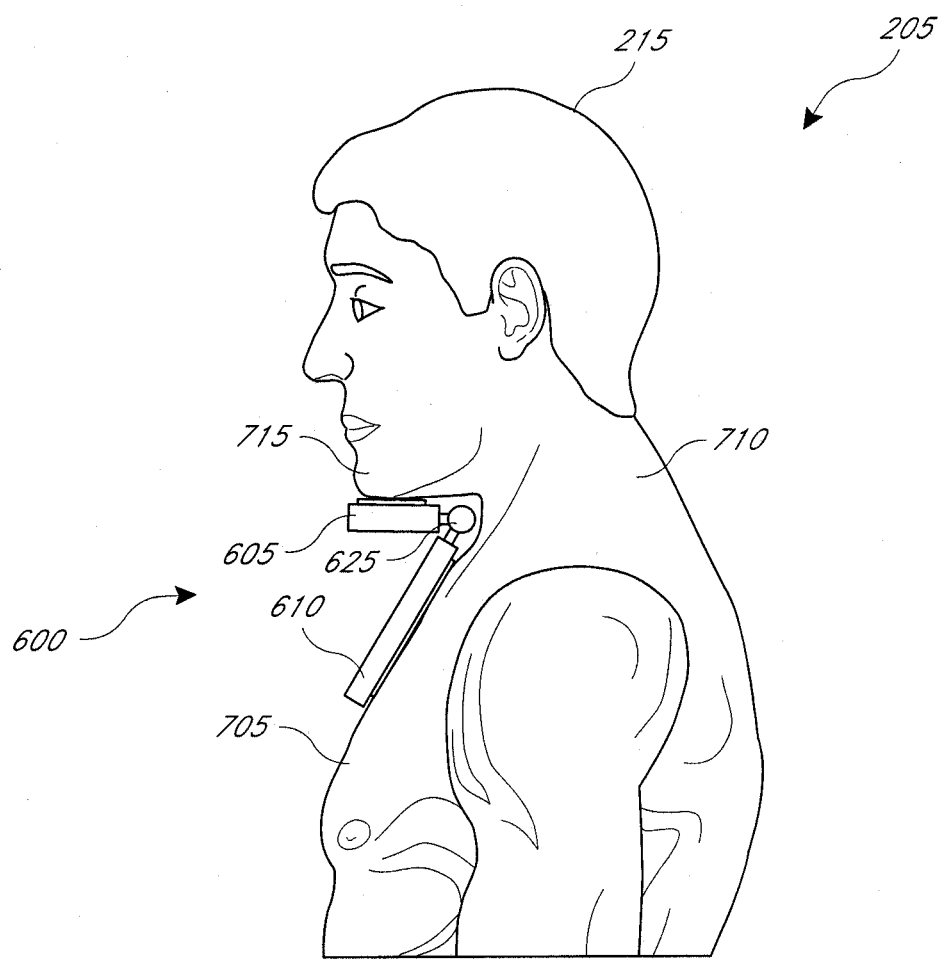
FIG. 6 is a side view of a user using a head supporting device according to an embodiment.

Some embodiments provide a head supporting device that holds or supports a user's head in a forward-leaning position by transferring the weight of the head to the user's chest area. As shown in FIG. 6, the head supporting device 600 comprises a chin support member 605 having a first surface configured to at least partially contact a chin 715 of a user 205 and a chest support member 610 having a second surface configured to at least partially contact a chest 705 of the user 205, wherein the chin support member 605 is coupled to the chest support member 610 with a connecting member 625.

The chin support member 605 and chest support member 610 may be made of any material sufficient to substantially maintain its form while supporting the weight of a user's head 215. A chin support member 605 or chest support member 610 may, for example, be made of nylon, other types of plastic, metal, wood, or a sufficiently stiff rubber material.

Figure 7:
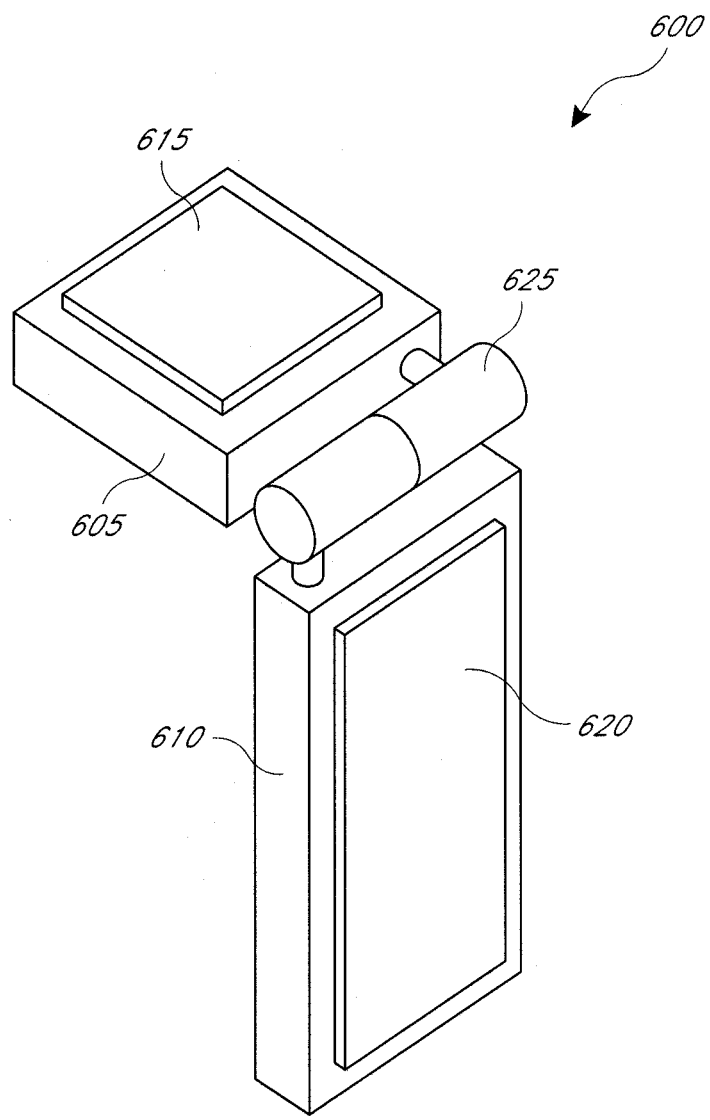
FIG. 7 is a perspective view of the head supporting device of FIG. 6 according to an embodiment.

In some embodiments, the first surface of the chin support member may include a chin pad 615 and the second surface may include a chest pad 620 (as shown in FIG. 7). The chin pad 615 and the chest pad 620 may provide comfort to the user, and may also provide some friction that can prevent the device from slipping during use. A chin pad or chest pad may be made of different materials as long as it provides comfort to the user and is reasonably gentle to the skin and bone area. Examples of materials for a chin or chest pad are: memory foams, cotton, neoprene, etc. In addition, the chin or chest pad may be configured to be easily interchangeable and washable. The chin or chest pad may be configured to attach to the chin or chest support member with hook-and-loop fasteners or Velcro.

An additional feature that a chin or chest pad may incorporate is the capability to release selected fragrances in order to enhance the relaxation of the user. The relatively small distance between the chin and chest pads and the user's nasal area makes it relatively easy to divert the desired fragrance from the chin or chest pad to the user's nose.

In some embodiments the connecting member 625 is a friction hinge, meaning the connecting member 625 will resist rotational forces applied to the chin support member 605 or chest support member 610, but will allow rotation once a predetermined level of rotational force has been applied to the connecting member 625. In other embodiments, the connecting member 625 is a position or lever-lock hinge, or any other type of connector that is able to sustain a preferred angle between the chin support member 605 and the chest support member 610. Position, lever-lock, and friction hinges hold doors, lids, and hatches in position, eliminating the need for latches, door holders, and other secondary support mechanisms. An example of a friction hinge is on the display of a laptop computer. A laptop computer display can often be positioned at any angle without secondary support. All of these hinges withstand an amount of rotational force, or torque, to hold doors in position. The greater the torque rating of the hinge, the greater the force required to change the angle of the hinge.

Figure 8:
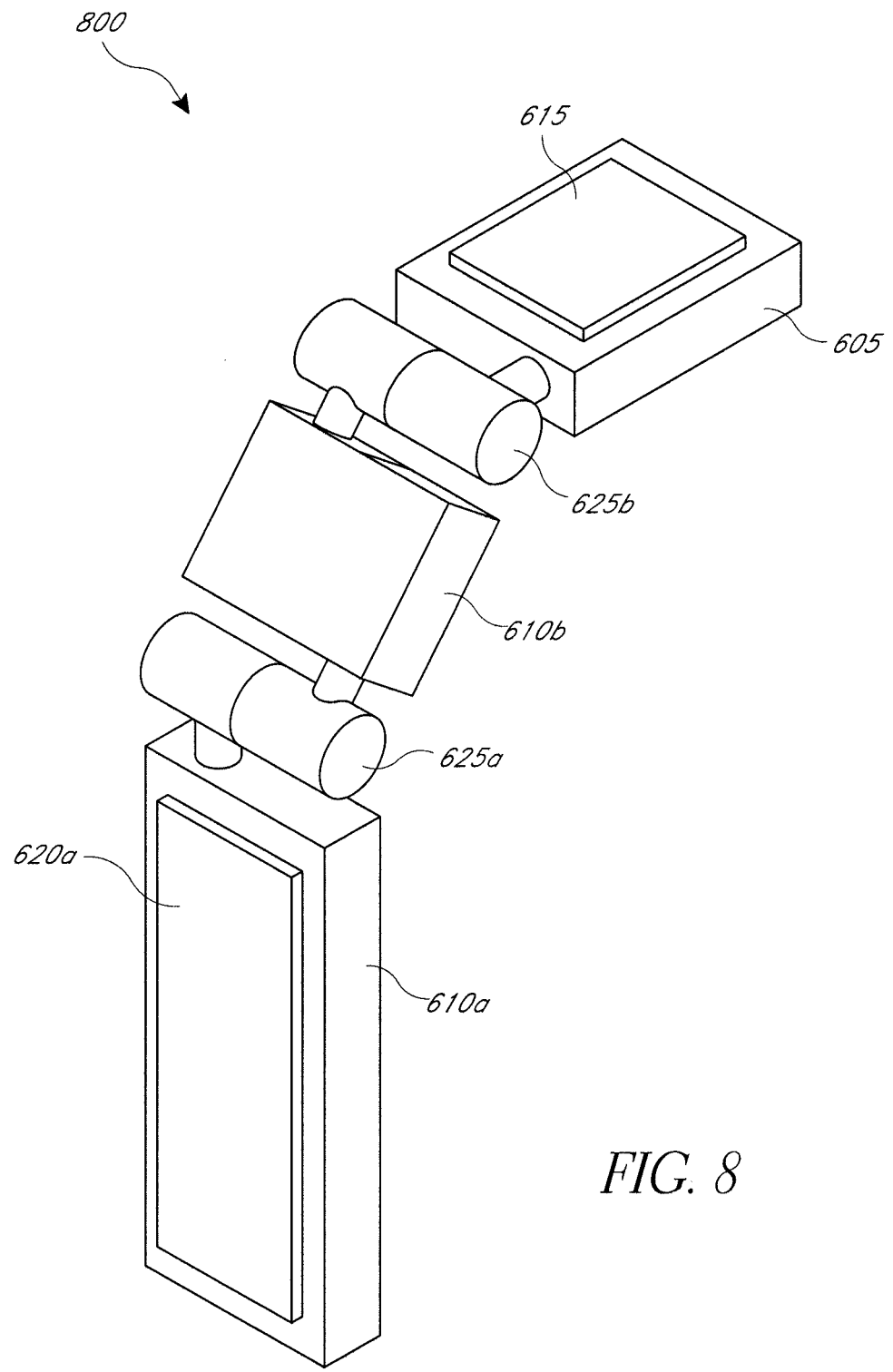
FIG. 8 is a perspective view of a head supporting device according to an embodiment.

In some embodiments, as shown in FIG. 8, a head supporting device 800 may include a double hinged chest support to enhance the adjustability of a head supporting device 800. The head supporting device 800 includes two chest support members 610a and 610b and two connecting members 625a and 625b. In use, the two chest support members 610a and 610b may be rotated relative to each other to more comfortably conform the head supporting device 800 to a user's chest 705. In some embodiments, one of the chest support members 610a may include a chest pad as described above. In other embodiments, both chest support members 610a and 610b may include chest pads on each of the chest supporting members. A double hinged design may therefore allow additional angle adjustability and may increase comfort.

Figure 9:
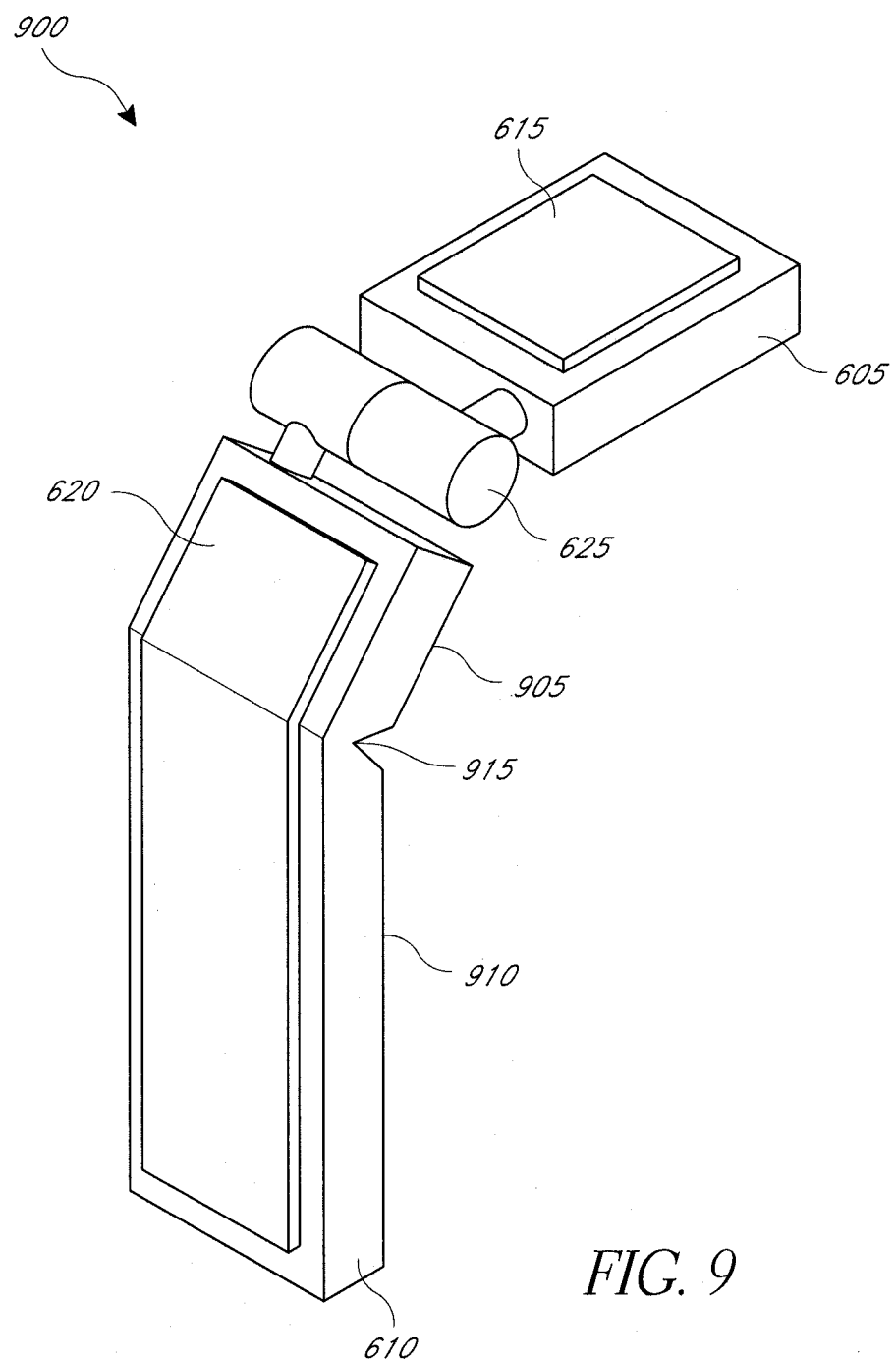
FIG. 9 is a perspective view of a head supporting device according to an embodiment.

In some embodiments, as shown in FIG. 9, a head supporting device 900 includes a flexible chest support. The head supporting device 900 includes a chest support member 610 that further includes an upper portion 905, a lower portion 910, and a flexible joint 915. The upper portion 905 of the chest support member 610 is flexibly connected to the lower portion 910 of the chest support member 610 through the flexible joint 915. In use, the flexible joint 915 flexes to allow the chest pad 620 to more comfortably conform to a user's chest. In some embodiments, the flexible joint 915 may comprise a portion of the chest support member 610 that has a thinner thickness than other portions of the chest support member 610, allowing the chest support member 610 to elastically bend at the flexible joint 915. In some embodiments, the chest support member may have more than one flexible joint. In other embodiments, there are more than one separate chest support members attached to the chest pad, using the chest pad as a flexible joint.

In some embodiments, a head supporting device, such as the head supporting device 600 shown in FIG. 6, may incorporate different accessories such as: an alarm clock and/or watch, a music player, a smart phone or other electronic device holder, or temperature control systems of the chin and the chest support members to enhance the user's comfort according to the ambient temperature. A head supporting device package can consist of a sleeping kit that includes a sleeping mask and ear plugs, ear phones, music player, etc.

In using a head supporting device, the user's chin 715 may rest on the chin support member 605 and the weight of the head 215 may be partially transferred to the chest 705 through the connecting member 625 and the chest support member 610. In some embodiments, the head supporting device 600 may be built in such way that an angle between the chin support member 605 and the chest support member 610 is variable and can be easily adjusted by a user in order to achieve the most comfortable position. A variable angle between the chin and chest members is referred to as (a) angle. In some embodiments, the angle between the chin and the chest may be between about 30 degrees and about 120 degrees.

The connecting member 625 supports the force created by the weight of the head 215 as well as the momentum created by this force in order to maintain the angle at the desired position. The average weight of the head of a person is around 5 kg. Therefore, the connecting member 625 may be able to sustain a vertical force of:

$$F = \text{weight} \times \text{gravity} = 5 \text{ kg} \times 9.8 \frac{m}{s^2} = 49N$$

The displacement of the center of gravity of the head 215 with respect the pivot point (the neck 710) is approximately 0 m to 0.1 m. Therefore, the expected momentum that the connecting member 625 may need to resist is:

$$M_{min} = F \times d_{min} = 49N \times 0 \text{ m} = 0 \text{ Nm}$$

and $$M_{max} = F \times d_{max} = 49N \times 0.1 \text{ m} = 4.9 \text{ Nm}$$

A suggested torque rating for the connecting member 625 is between 1 and 10 Nm. The angle ($\alpha$) that provides the most comfortable support varies from user to user and it ranges in between about 30 deg. to about 120 deg.

In order to anchor the chest support member 610 to the user 205, various methods of anchoring may be used. In some embodiments, a high friction chest pad is used. The chest pad 620 may incorporate a friction layer (or antiskid surface) in order to better anchor the head supporting device at the right position on the user's chest 705, such as the position shown in FIG. 6. A friction layer will increase the coefficient of friction between the chest support member 610 or chest pad 620 and the user's chest 705.

Some embodiments use a neck strap to anchor the head supporting device 600. An adjustable strap may be attached to the head supporting device 600 and surround the neck 710 of the user 205, thereby anchoring the head supporting device 600 at the desired position. The strap may be padded, non-padded, elastic, or rigid. Examples of materials for the strap are cotton, nylon, neoprene, or any other material sufficient to anchor the head supporting device 600.

In some embodiments, a friction back anchor may be used to anchor the head supporting device 600. This solution consists of an anchoring plate that is sandwiched in between the backrest of a seat and a user. A connecting strap connects to the anchoring plate, extends over the user's shoulders, and connects to the head supporting device 600, holding the head supporting device 600 in place beneath the user's head. As the user's head leans on the head supporting device 600, the exerted force is transferred to the anchoring plate through the connecting strap. It is the pressure applied by the user onto the seat that fixes the anchoring plate in place and prevents excessive movement of the head supporting device 600. The friction back anchor can be made of a high friction material and can also serve as a carrying bag for the head supporting device.

In some embodiments, a rigid backplate anchor is used to anchor the head supporting device (such as the devices 600, 800 or 900 as shown in FIGS. 7-9). The backplate anchor may be the similar to the first member 110 shown in FIG. 1. In some embodiments, the backplate anchor is the same as the first member 110 described herein. In other embodiments, the backplate anchor may be shorter than the embodiments of the first member 110. The head supporting device may be attached to the backplate anchor, with the backplate anchor being sandwiched between a user's back and a backrest of a seat. A strap or other connector may be used to connect the head supporting device to the backplate anchor. The momentum created by the force exerted by the head supporting device 600 on the backplate anchor is balanced out by the momentum created by a reaction force of the backrest on the backplate anchor.

In some embodiments, a backplate anchor, such as the first member 110 shown in FIG. 1, is used to anchor a head supporting device, such as the head supporting device 600, 800 or 900 shown in FIGS. 7-9, along with a support apparatus, such as the support apparatus 105 shown in FIG. 1. An object of such a device is to further support the head and neck and provide for an even more comfortable seating position.

The head supporting device embodiments described herein may provide certain advantages, including: providing true neck support by relieving neck muscles from balancing out the weight of the head, enabling or facilitating sleep on almost any seat, and providing a comfortable headrest when the seat does not provide one. Additionally, certain embodiments are small, thin, and lightweight travel accessories that can even fit in small laptop bags and that can be a platform for multiple objects allowing the user free use of his hands for other functions.

Certain embodiments include a padded member, which may be useful in situations where a seat does not include a headrest or the seat's backrest is too low. In those situations, the user can lean back onto the padded member and first member. In this mode, the first member behaves as an extension of the seat and provides a solid support where the head can rest.

The portability of a head supporting device makes it an ideal device to improve the comfort of any seat. Examples of situations where a head supporting device can be used are: sleeping, reading, or resting on an airplane, bus, train, etc.; or sleeping, reading, or resting at a work desk. A head supporting device may also be used to provide extra neck support while working on a computer or for any office chair that does not incorporate a headrest.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. Thus, it is intended that the scope of the present invention herein disclosed should not be limited by the particular disclosed embodiments described above.

What is claimed is:

1. A head supporting device comprising:
   a first member configured to be at least partially sandwiched between a user and a seat;
   a support apparatus configured to at least partially support the head of the user relative to the first member; and
   a coupling member configured to couple the support apparatus to the first member, the coupling member further configured to enable positioning of the support apparatus with respect to the first member,
   wherein the coupling member connects to the support apparatus at a first joint and the coupling member connects to the first member at a second joint,
   wherein at least one of the first joint and the second joint comprises a first half and a second half, each of the first half and the second half comprising alternating fingers and interstitial spaces, and
   wherein the fingers of the first half are configured to mesh with the fingers of the second half along an axis of rotation.

2. The head supporting device of claim 1, wherein each of the first joint and the second joint comprises a pivot joint, wherein a first axis of rotation of the first joint is parallel to a second axis of rotation of the second joint.

3. The head supporting device of claim 1, wherein at least one of the first joint and the second joint has a locked state and an unlocked state, wherein the locked state is configured to have sufficient rigidity to enable the supporting of the head of the user, and the unlocked state is configured to enable the positioning of the support apparatus.

4. The head supporting device of claim 1, wherein at least one of the first joint and the second joint further comprises a cam configured to increase a friction force between at least some of the fingers of the first half and the second half or to decrease the friction force between at least some of the fingers of the first half and the second half.

5. The head supporting device of claim 1, wherein each of the first joint and the second joint is selected from the group consisting of a pivot joint, a hinge joint, a ball and socket joint, a flexible joint, and a sliding joint.

6. The head supporting device of claim 1, wherein the first member comprises a backplate anchor.

7. The head supporting device of claim 1, wherein the first member comprises at least two legs separated by a gap.

8. The head supporting device of claim 1, wherein the first member is configured to be collapsible using a hinge joint, pivot joint, or sliding joint.

9. The head supporting device of claim 1, wherein the support apparatus comprises a strap configured to at least partially encircle the user's head.

10. The head supporting device of claim 9, wherein the strap comprises at least one elastic section.

11. The head supporting device of claim 10, wherein the at least one elastic section is configured to enable a full length of the strap to stretch by about 5% to about 8%.

12. The head supporting device of claim 9, wherein the strap comprises at least one adjuster configured to enable adjustment of a length of the strap.

13. The head supporting device of claim 9, wherein the support apparatus further comprises a base portion configured to be positioned at least partially behind the user's head, wherein the strap is configured to connect to the base portion.

14. The head supporting device of claim 13, wherein at least one end of the strap is configured to be releasably coupled to the base portion of the support apparatus.

15. The head supporting device of claim 1, wherein the support apparatus further comprises a padded member.

16. The head supporting device of claim 1, wherein the support apparatus further comprises a sleeping mask.

* * * * *